(12) United States Patent
Donati et al.

(10) Patent No.: US 10,301,050 B2
(45) Date of Patent: May 28, 2019

(54) SHUTTER FOR A VALVE AND CORRESPONDING VALVE FOR CONTROLLING AN AIR FLOW AND RELATIVE VALVE

(71) Applicant: Tetra Laval Holdings & Finance S.A., Pully (CH)

(72) Inventors: Andrea Donati, Castelnuovo Rangone (IT); Daniele Anzaldi, Eindhoven (NL); Andrea Barbieri, Modena (IT); Daniele Apparuti, Montale Rangone (IT); Robert Bartolini, Guiglia-Modena (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 556 days.

(21) Appl. No.: 14/418,760

(22) PCT Filed: Jul. 24, 2013

(86) PCT No.: PCT/EP2013/065572
§ 371 (c)(1),
(2) Date: Jan. 30, 2015

(87) PCT Pub. No.: WO2014/023573
PCT Pub. Date: Feb. 13, 2014

(65) Prior Publication Data
US 2015/0210417 A1    Jul. 30, 2015

(30) Foreign Application Priority Data

Aug. 10, 2012    (EP) .................................... 12180194

(51) Int. Cl.
*F16K 5/12*    (2006.01)
*B65B 55/10*    (2006.01)
(Continued)

(52) U.S. Cl.
CPC ............ *B65B 55/106* (2013.01); *B65B 51/20* (2013.01); *B65B 55/103* (2013.01);
(Continued)

(58) Field of Classification Search
CPC ................................. F16K 5/0605; F16K 5/12
(Continued)

(56) References Cited

U.S. PATENT DOCUMENTS 1,638,152 A * 8/1927 Gabriel ................. F16K 5/0207
251/160
2,510,514 A * 6/1950 Mueller ................ F16K 5/0464
251/209
(Continued)

FOREIGN PATENT DOCUMENTS

CN    101985318 A    3/2011
DE    551909 C    6/1932
(Continued)

OTHER PUBLICATIONS

International Search Report (PCT/ISA/210) dated Aug. 26, 2013, by the European Patent Office as the International Searching Authority for International Application No. PCT/EP2013/065572.
(Continued)

*Primary Examiner* — Andrew M Tecco
*Assistant Examiner* — Eyamindae C Jallow
(74) *Attorney, Agent, or Firm* — Buchanan Ingersoll & Rooney PC (57) ABSTRACT

There is described a shutter for a valve for controlling an air flow; shutter is selectively rotatable about an axis and adapted to be housed inside a body of valve, and comprises a surface disposed about axis; surface comprises at least one first curved portion shaped eccentrically relative to axis so as to define, in use and together with body, at least one first passage for the air flow.

12 Claims, 10 Drawing Sheets

(51) Int. Cl.
*F16K 5/04* (2006.01)
*B65B 51/20* (2006.01)
*F16K 5/06* (2006.01)
*F16K 5/10* (2006.01)
*B65B 9/12* (2006.01)

(52) U.S. Cl.
CPC .......... *F16K 5/0407* (2013.01); *F16K 5/0605* (2013.01); *F16K 5/10* (2013.01); *F16K 5/12* (2013.01); *B65B 9/12* (2013.01)

(58) Field of Classification Search
USPC .................. 53/167; 251/209; 137/625.32
See application file for complete search history.

(56) References Cited

U.S. PATENT DOCUMENTS

| | | | | |
|---|---|---|---|---|
| 3,322,149 A | * | 5/1967 | Haenky | F16K 5/0407 137/625.12 |
| 3,352,155 A | * | 11/1967 | Penet | F16K 5/0605 251/209 |
| 3,762,682 A | * | 10/1973 | Franck | F16K 5/10 251/124 |
| 3,883,113 A | * | 5/1975 | Kolb | F16K 5/0605 251/151 |
| 4,364,415 A | * | 12/1982 | Polon | F16K 5/12 137/625.32 |
| 4,774,984 A | * | 10/1988 | Peters | F16K 47/045 137/625.32 |
| 4,881,718 A | | 11/1989 | Champagne | |
| 4,889,163 A | * | 12/1989 | Engelbertsson | F16K 5/0605 137/625.32 |
| 5,108,075 A | | 4/1992 | Downard et al. | |
| 5,524,863 A | * | 6/1996 | Davis | B08B 9/00 137/625.32 |
| 6,039,304 A | * | 3/2000 | Carlson | F16K 5/12 251/118 |
| 7,007,441 B2 | | 3/2006 | Benedetti et al. | |
| 7,178,782 B1 | * | 2/2007 | York | F16K 5/12 137/625.3 |
| 2001/0030309 A1 | * | 10/2001 | Carlson | F16K 5/12 251/209 |
| 2003/0205685 A1 | * | 11/2003 | Whang | F16K 5/10 251/209 |
| 2005/0076612 A1 | * | 4/2005 | Andersson | B65B 55/103 53/167 |
| 2005/0126117 A1 | | 6/2005 | Benedetti et al. | |
| 2005/0166964 A1 | | 8/2005 | Hall | |
| 2009/0065724 A1 | | 3/2009 | Mitton et al. | |

FOREIGN PATENT DOCUMENTS

| | | |
|---|---|---|
| EP | 1334911 A1 | 8/2003 |
| FR | 2432122 A1 | 2/1980 |
| GB | 1531332 A | 11/1978 |
| JP | 57-8952 U | 1/1982 |
| JP | 61-119668 U | 7/1986 |
| JP | 61-185407 U | 11/1986 |
| JP | 2005-516857 A | 6/2005 |
| NL | 7413052 A | 4/1975 |
| WO | WO 2006/053414 A1 | 5/2006 |

OTHER PUBLICATIONS

Office Action (Notice of Reasons for Rejection) issued by the Japan Patent Office dated Mar. 13, 2017 in corresponding Japanese Patent Application No. 2015-525808 with English language translation of Office Action. (9 pgs).

* cited by examiner

SHUTTER FOR A VALVE AND CORRESPONDING VALVE FOR CONTROLLING AN AIR FLOW AND RELATIVE VALVE

TECHNICAL FIELD

The present invention relates to shutter for a valve for controlling an air flow in a packaging machine.

BACKGROUND ART

As it is known, many food products, such as fruit juice, pasteurized or UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may be defined by a layer of fibrous material, e.g. paper, or mineral-filled polypropylene material; and a number of layers of heat-seal plastic material, e.g. polyethylene film, covering both sides of the base layer.

In the case of aseptic packages for long-storage products, such as UHT milk, the packaging material may also comprise a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

As is known, packages of this sort are produced on fully automatic packaging machines, on which the tube is formed continuously from the web-fed packaging material. More specifically, the web of packaging material is unwound off a reel and fed through a station for applying a sealing strip of heat-seal plastic material, and through an aseptic chamber on the packaging machine, where it is sterilized, e.g. by applying a sterilizing agent such as hydrogen peroxide, which is subsequently evaporated by heating.

The web of packaging material is then fed through a number of forming assemblies which interact with the packaging material to fold it gradually from strip form into a tube shape.

More specifically, a first portion of the sealing strip is applied to a first longitudinal edge of the packaging material, on the face of the material eventually forming the inside of the packages; and a second portion of the sealing strip projects from the first longitudinal edge.

The forming assemblies are arranged in succession, and comprise respective roller folding members defining a number of packaging material passages varying gradually in cross-section from a C shape to a substantially circular shape.

On interacting with the folding members, the second longitudinal edge is laid on the outside of the first longitudinal edge with respect to the axis of the tube being formed. More specifically, the sealing strip is located entirely inside the tube, and the face of the second longitudinal edge facing the axis of the tube is superimposed partly on the second portion of the sealing strip, and partly on the face of the first longitudinal edge located on the opposite side to the first portion of the sealing strip.

Packaging machines of the above type are known in which the first and second longitudinal edges are heat sealed within the aseptic chamber to form a longitudinal seal along the tube, which is then filled with the sterilized or pasteurized food product.

Furthermore, the packaging machines of the above type comprise a forming unit in which the tube and is sealed and cut along equally spaced cross sections to form pillow packs.

The forming unit comprise two or more jaws which cyclically interact with the tube to seal it.

The pillow packs are then folded mechanically to form respective packages at a folding unit, which is arranged downstream of the movable components of the forming unit.

In detail, the forming unit is arranged downstream of the aseptic chamber, with reference to the advancing direction of the tube.

The above described packaging machine comprises a plurality of branches which output relative flows of hot sterile air, e.g. at a temperature ranging between 5 to 280° C., inside the aseptic chamber.

In particular, a first branch comprises a plurality of nozzles which output a first hot sterile air flow inside the aseptic chamber in order to keep it at the given value of temperature and pressure greater than the environment pressure.

A second branch comprises a nozzle which outputs a second hot sterile air flow onto the superimposed longitudinal edges, so as to form the longitudinal seal along the tube.

A third branch comprises a nozzle which is arranged downstream of the second branch, proceeding according to the advancing direction of the tube.

The third branch is activated only when the operation of the packaging machine starts again after an interruption.

In case of interruption, the portion of packaging material facing the nozzle of the second branch cools down, after having been previously heated.

The re-start of the packaging machine brings that portion in front of the nozzle of the third branch. At this stage, the nozzle of third branch is operated to output a third hot sterile air flow towards the packaging material. That third hot sterile air flow heats again this portion of the packaging material and ensure that the complete formation of the longitudinal seal.

Finally, a fourth branch comprises a nozzle which outputs a hot sterile air flow onto the web packaging material upstream of the aseptic chamber and before the packaging material is formed into a tube shape, in order to remove, by heating, the residual of hydrogen peroxide from the packaging material.

The above identified hot sterile air flows are regulated by respective control valves.

In particular, control valves are known which substantially comprise:

an outer body which defines an inlet opening and outlet opening for the sterile air flow; and
a disk or ball shaped shutter housed inside the outer body.
The shutter can be rotated between:
a fully open position in which it allows the hot sterile air to flow from the inlet opening to the outlet opening of the body; and
a fully closed position in which it prevents the hot sterile air from flowing between the inlet opening and the outlet opening.

Due to the shape and construction of the shutter, the known valve has a poor capability of smoothly modulating the flow of hot sterile air flow.

In particular, with the known valve, the amount of sterile air flow suddenly grows from zero to the maximum value, when the shutter rotates from the fully closed position to the fully open position.

In other words, the plot of sterile air flow versus a rotation angle of the shutter is steep, is highly non-linear and reaches the maximum value after a small rotation angle of the shutter.

As a result, the hot sterile air flow is not precisely controllable.

A need is felt within the industry to obtain a variation as linear as possible of the sterile air flow in relation to the rotation angle for a wide range of rotation angle of the shutter, with a limited number of components and without affecting the possibility of preserving the sterility of the shutter.

DISCLOSURE OF INVENTION

It is therefore an object of the present invention to provide a shutter for a valve for controlling a sterile air flow in a packaging machine.

This object is achieved by a shutter as claimed in claim 1.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figure 12:
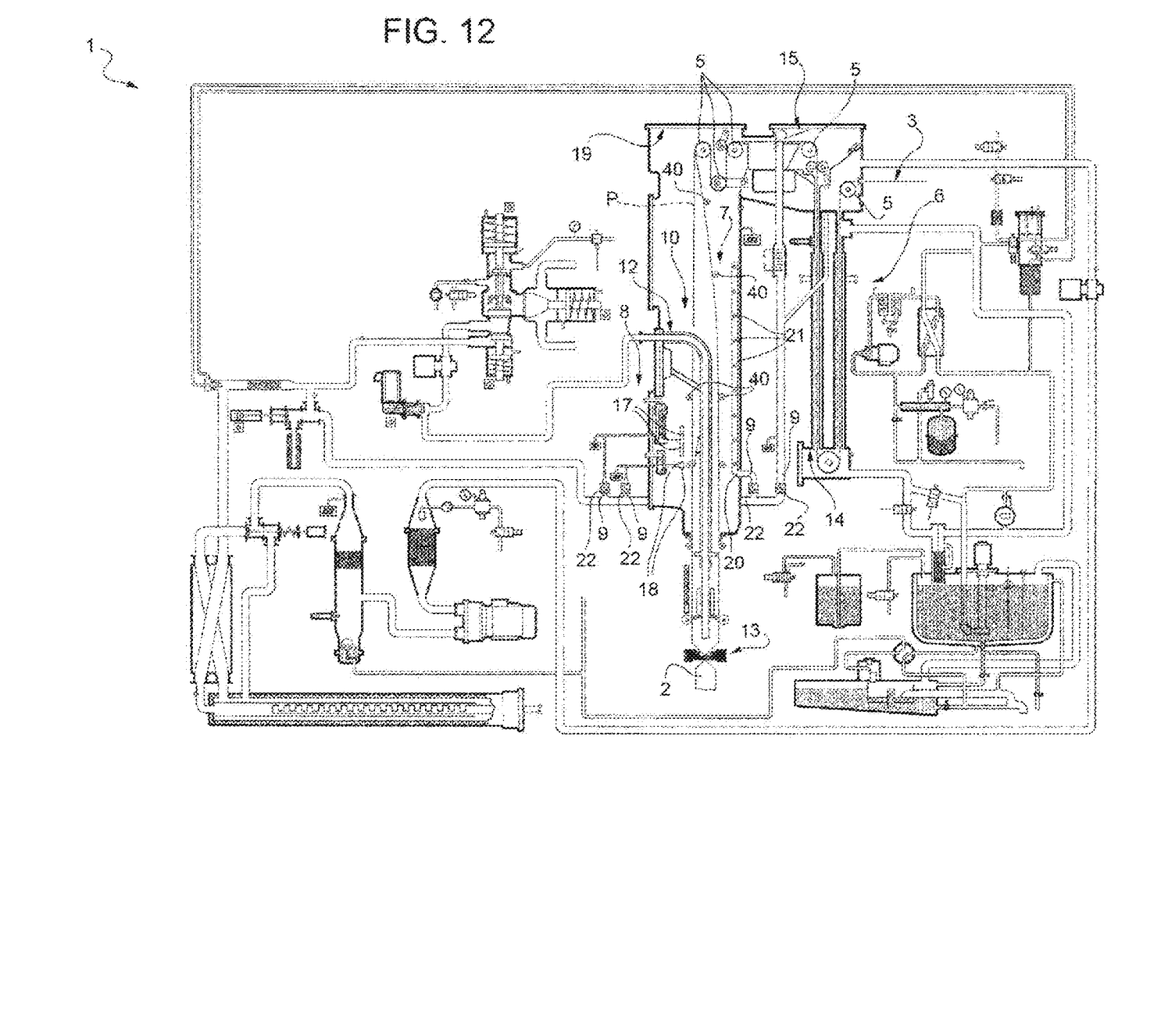
FIG. 12 is a schematic view of a packaging machine into which a plurality of valves of FIGS. 1 to 11 are installed, with parts removed for clarity.
Figure 13:
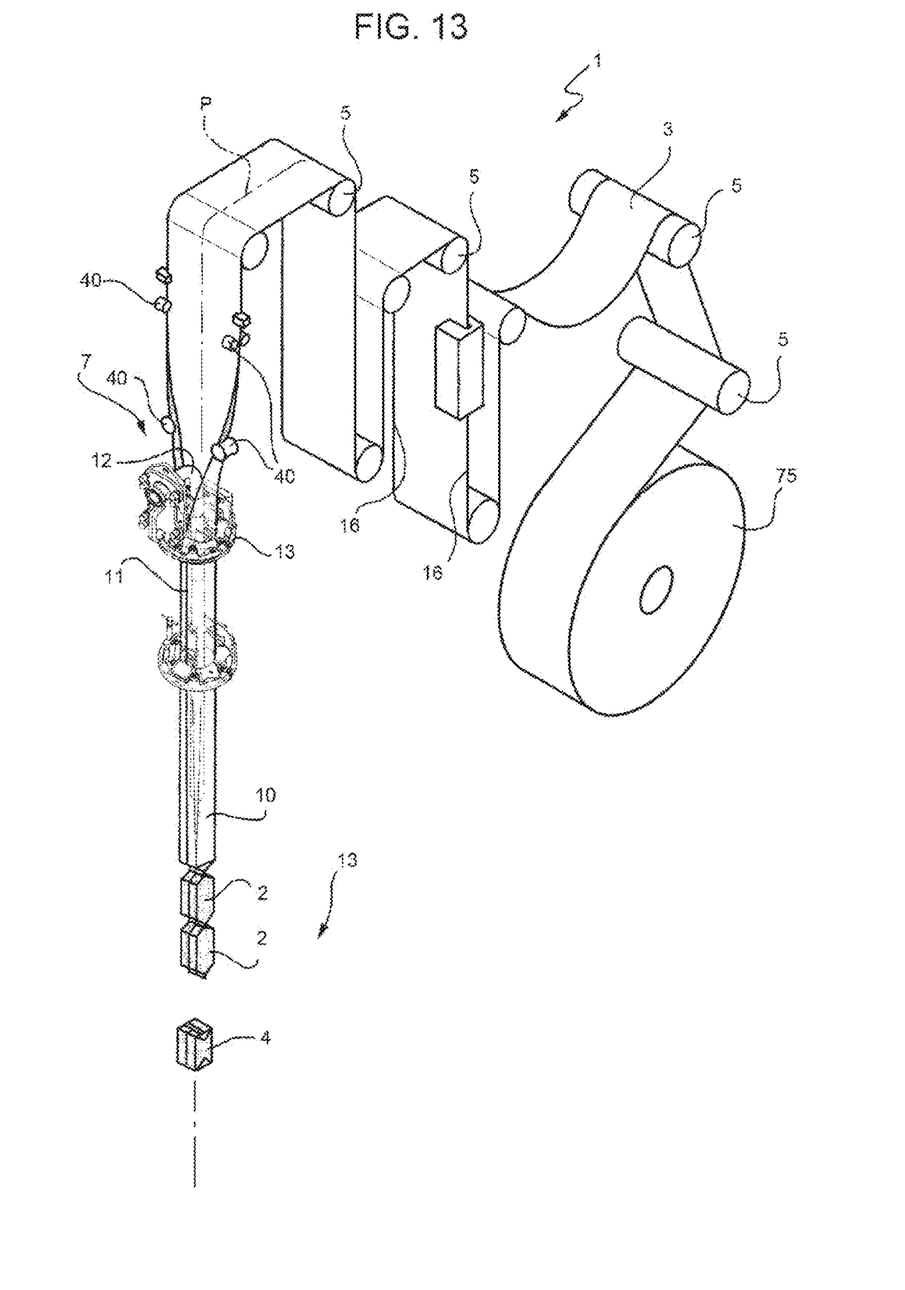
FIG. 13 is a perspective view of the packaging machine of FIG. 12.

Number 1 in FIGS. 12 and 13 indicates as a whole a packaging machine for continuously producing sealed packages 4 of a food product from a web 3 of packaging material, which is unwound off a reel 75 and fed along a forming path P.

Machine 1 preferably produces sealed packages 4 of a pourable food product, such as pasteurized or UHT milk, fruit juice, wine, peas, beans, etc.

Machine 1 may also produce sealed packages 4 of a food product that is pourable when producing packages 4, and sets after packages 4 are sealed. One example of such a food product is a portion of cheese, that is melted when producing packages 4, and sets after packages 4 are sealed.

The packaging material has a multilayer structure substantially comprising a base layer for stiffness and strength, which may be defined by a layer of fibrous material, e.g. paper, or mineral-filled polypropylene material; and a number of layers of heat-seal plastic material, e.g. polyethylene film, covering both sides of the base layer.

Machine 1 substantially comprises, proceeding along path P:
- a number of guide members 5, e.g. rollers or similar, which feed web 3 along path P;
- a sterilizing station 6 for sterilizing web 3 of packaging material;
- a forming station 7 for forming a tube 10 of packaging material having an axis A;
- a station 8 for heat sealing a longitudinal seal 11 along tube 10;
- a filling device 12 for pouring the sterilized or sterile-processed food continuously into tube 10; and
- a forming unit 13 for transversally sealing and cutting tube 10, so as to form pillow packs 2 which are subsequently folded (in not-shown way) into relative packages 4.

In detail, sterilizing station 6 comprises, proceeding along path P, (FIG. 12):
- a tank 14 filled with a sterilizing agent, such as hydrogen peroxide, through which web 3 is advanced; and
- a nozzle 15 arranged downstream of tank 14 proceeding along path P, and adapted to blow a jet of hot sterile air onto web 3 coming out from tank 14, so as to remove, by evaporation, the hydrogen peroxide.

Station 7 comprises a number of forming assemblies 40 arranged successively along path P, and which interact gradually with web 3 to fold it into the form of tube 10.

More specifically, forming assemblies 40 comprise respective numbers of rollers defining respective compulsory packaging material passages, the respective sections of which vary gradually from a C shape to a substantially circular shape.

Station 8 comprises a plurality of nozzles 17 adapted to blow hot sterile air onto superimposed longitudinal edges 16 (FIG. 13) of tube 10 in order to heat seal the packaging material of edge 16 and thus a creating longitudinal seal 11 (FIG. 13).

In this way, seal 11 can be formed even when the packaging material does not comprise a layer of conductive material, e.g. aluminum.

Furthermore, station 8 comprises a plurality of so-called "short stop" nozzles 18 which are arranged downstream of nozzle 17, proceeding along path P.

Furthermore, nozzles 18 are arranged in front of superimposed edges 16 of tube 10.

In case of interruption of the operation of packaging machine 1, previously heated superimposed longitudinal edges 16 arranged in front of nozzles 18 cool down.

In this case, when machine 1 starts again, nozzles are activated in order to eject a hot sterile air flow onto cooled down superimposed edges 16, so as to heat seal the packaging material of edges 16 and ensure that longitudinal seal 11 is perfectly formed.

Machine 1 also comprises (FIG. 12):
- an aseptic chamber 19 which houses station 7 and 8 and is filled with sterile air at a temperature and a pressure greater than those of the environment; and
- a rail 20 provided with a plurality of nozzles 21 adapted to blow hot sterile air inside chamber 19.

In particular, filling device 12 fills tube 10 with pourable product inside aseptic chamber 19.

Machine 1 also comprises a plurality of branches 9, four in the embodiment shown, fed with hot sterile air at a certain pressure preferably by the same source and comprising relative control valves 22 for controlling the flows of hot sterile air flows to be fed to respective nozzles 15, 17, 18, 21.

Furthermore, valves 22 are configured to control the flow of hot sterile air at a temperature ranging from 5 to 280° C.

In particular, valves 22 are fluidly connected with respective nozzles 15, 17, 18, 21 by respective conduits 24.

Valves 22 being identical, in the example described herein, only one is described below.

With reference to FIGS. 1 to 10, valve 22 substantially comprises:
- a body 25 defining an inlet opening 26 and an outlet opening 27 for the hot sterile air flow;
- a shutter 30 housed inside body 25 in a rotary manner about an its own axis A; and
- a rotary actuator 31 operatively connected with shutter 30 for setting it in a given angular position relative to body 25 and about axis A.

In detail, body 25 is symmetrical about axis A, is box-shaped and comprises:
- a pair of opposite walls 28, 29 parallel to axis A and which define respective openings 26, 27;
- a wall 32 extending orthogonally between walls 28, 29 and orthogonal to axis A; and
- a pair of walls 33a, 33b which extend orthogonally between walls 28, 29, are parallel to axis A and orthogonal to wall 32.

Valve 22 also comprises a lid 24 arranged orthogonally to walls 28, 29 and to axis A, and which closes body 25 on the opposite side of wall 32.

With reference to FIGS. 4 to 10, body 25 further comprises:
- a pair of arc-shaped walls 36a, 36b opposite to relative walls 33a, 33b, having relative concavities facing axis A and circumferentially interrupted about axis A; and
- a pair of inlet and outlet conduits 37, 38 which orthogonally protrude from walls 28, 29 towards axis A and have relative inlet and outlet mouths 41, 42 defined by openings 26, 27 respectively.

Mouths 41, 42 are circumferentially interposed between walls 36a, 36b and are arranged at a given radial distance from axis A.

Mouth 41 comprises, on the side of axis A, a pair of ends 70, 71 extending parallel to axis A. End 71 is radially closer than end 70 to axis A.

Mouth 42 comprises a pair of ends 80, 81 extending parallel to axis A. End 81 is radially closer than end 80 to axis A.

Proceeding about axis A, end 71 is interposed circumferentially between ends 70, 80 and end 81 is interposed circumferentially between ends 80, 70.

Walls 36a, 36b and mouths 41, 42 define a cylindrical seat 43 which houses shutter 30 and is fluidly connected with inlet and outlet openings 26, 27 through conduits 37, 38.

More precisely, conduits 37, 38 are symmetrical relative to axis A and are staggered relative to a mid-plane of walls 26, 27.

Figure 2:
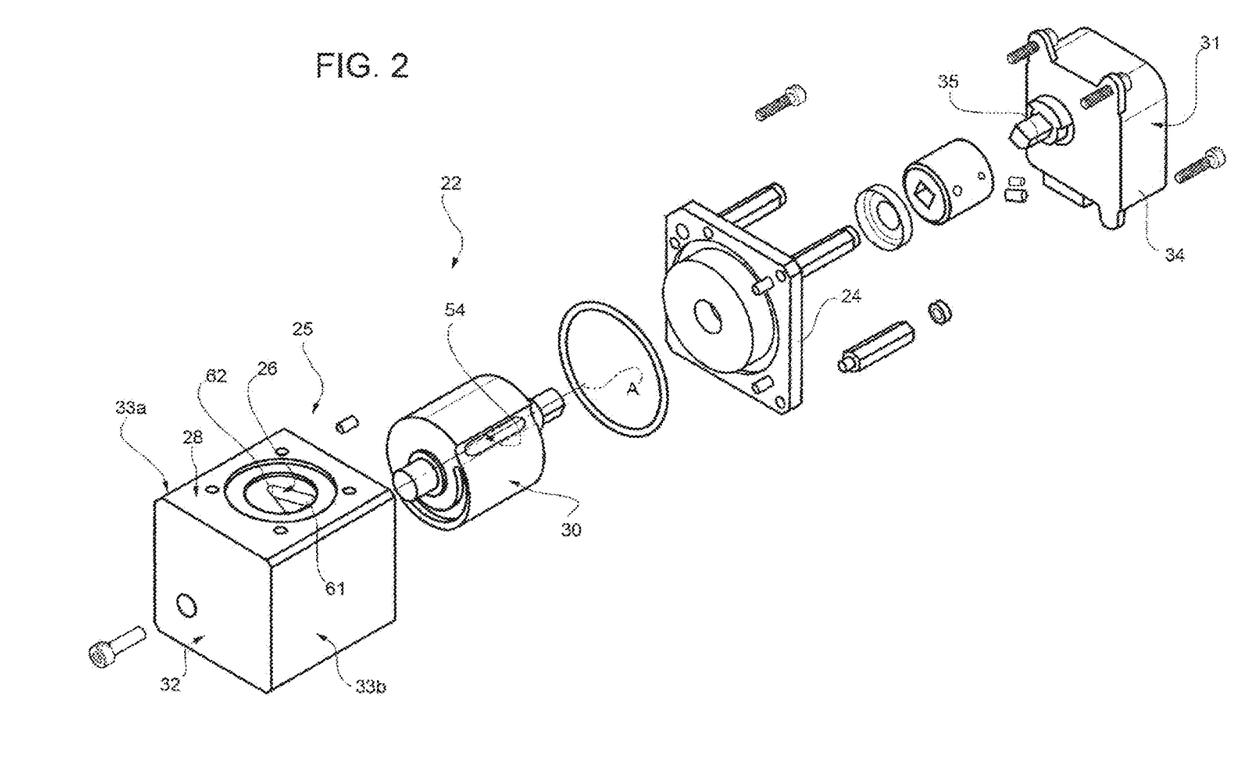
FIG. 2 is a perspective exploded view of the valve of FIG. 1.

Actuator 31 comprises a stator 34 and a rotor 35 operatively connected to shutter 30 (FIG. 2).

In the embodiment show, actuator 31 is a micro-motor fed with direct current, and comprises a gearbox interposed between rotor 35 and shutter 30.

Actuator 31 is controlled on the basis of the angular position of shutter 30, which is detected by a not-shown sensor.

Shutter 30 is tubular and symmetric about axis A.

Furthermore, shutter 30 comprises a surface 45 (FIGS. 5 to 10) which is disposed about axis A and faces mouths 41, 42 and wall 36a, 36b.

In particular, surface 45 faces the boundary of seat 43.

Surface 45 advantageously comprises (FIGS. 5 to 10):
- a curved portion 46 shaped eccentrically relative to axis A, so as to define with wall 36a, 36b a passage 56 for hot sterile air flow; and
- a curved portion 47 shaped eccentrically relative to axis A, so as to define with wall 36a, 36b a passage 57 for hot sterile air flow;

passages 56 and 57 are fluidly connected to one another.

In other words, portions 46, 47 are cam-shaped and extend at gradually varying radial distances from axis A.

Shutter 30 also comprises a through radial hole 54 which extends between portions 46, 47 and fluidly connects passage 56 with passage 57.

Surface 45 comprises a first half 44a and a second half 44b.

Half 44a comprises a section 50 and portion 46, and half 44b comprises a section 51 and portion 47.

Each half 44a, 44b extends about axis A for an arch of 180 degrees.

In detail, sections 50, 51 extend at the maximum radial distance from axis A, so as to define the maximum radial size of shutter 30.

Sections 50, 51 are opposite to one another relative to axis A.

Portion 46 is interposed circumferentially between sections 51, 50 and portion 47 is interposed circumferentially between sections 50, 51, proceeding according to the rotation sense of shutter 30 shown in FIGS. 5 to 10.

In the embodiment shown, sections 50, 51 have a certain circumferential size and are separated from wall 36a, 36b by a certain gap. In this way, the hot sterile air may flow inside the gap and sterilizes whole surface 45.

Each portion 46, 47 also comprises a relative section 52, 53 interposed between sections 50, 51 and which extend at the minimum radial distance from axis A, so as to define the minimum radial size of shutter 30.

Figure 4:
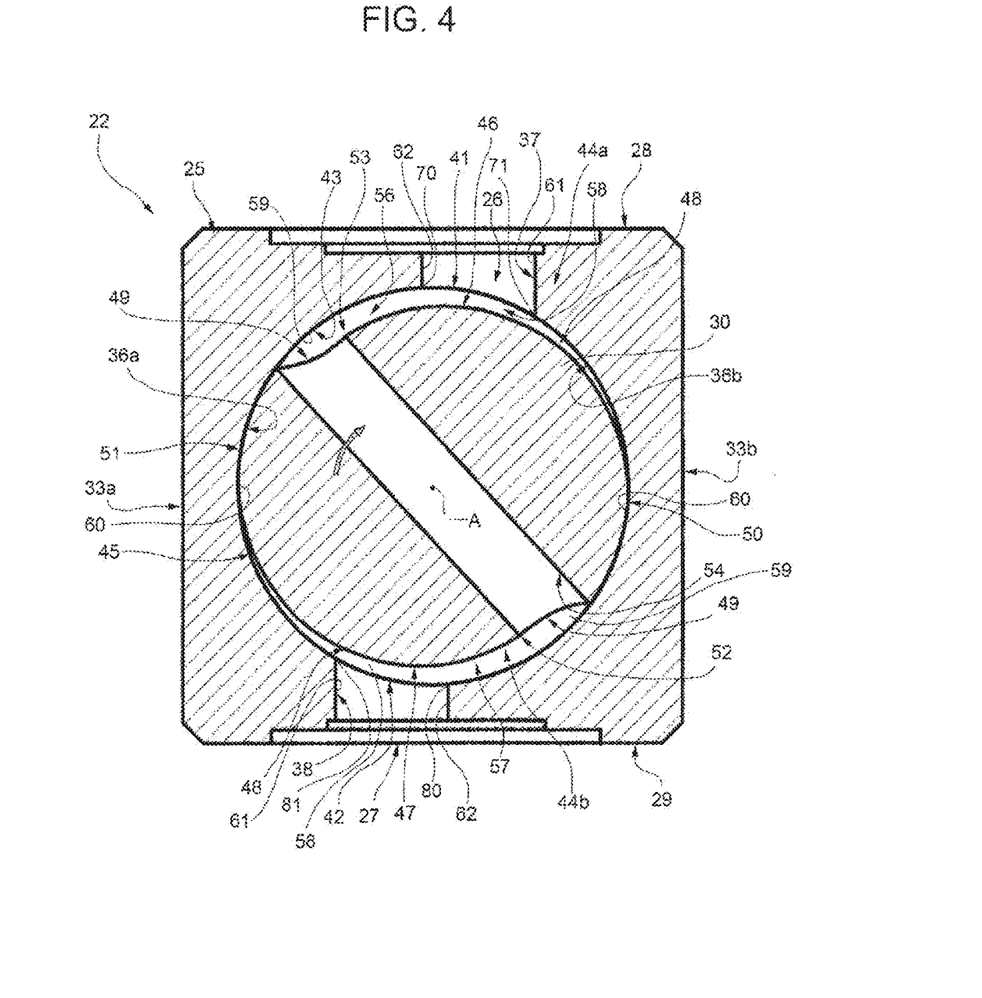
FIG. 4 is a transversal section of the valve of FIGS. 1 to 3.

With reference to FIG. 4, portion 46 comprises, proceeding from section 51 to section 50 according to the rotation sense of shutter 30 shown in FIGS. 5 to 10:
- a stretch 49 which extends at gradually decreasing radial distances from axis A;
- section 53; and
- a stretch 48 which extends at gradually increasing radial distance from axis A.

In a completely analogous way, portion 47 comprises, proceeding from section 50 to section 51 according to the rotation sense of shutter 30 shown in FIGS. 5 to 10:
- a stretch 49 which extends at gradually decreasing radial distances from axis A;
- section 52; and
- a stretch 48 which extends at gradually increasing radial distance from axis A.

Stretch 49 extends about axis A for an arch narrower than the one of stretch 48.

In other words, stretch 49 extends generally circumferentially about axis A for a relatively shorter distance compared to stretch 48.

Hole 54 extends between stretches 49.

Hole 54 is elongated parallel to axis A, as shown in FIG. 2.

Each passage 56, 57 is radially defined by a relative half 44a, 44b of surface 45 and the boundary of seat 43.

Each passage 56 comprises, proceeding from section 51 to section 50 according to the rotating sense of shutter 30 shown in FIGS. 5 to 10:
- a relative portion 59 radially defined between stretch 49 and the boundary of seat 43, and which has gradually increasing radial size; and
- a relative portion 58 radially defined between stretch 48 and the boundary of seat 43, and which has gradually decreasing radial size; and
- a relative constant radial size portion 60 radially defined between section 50 and the boundary of seat 43.

In the very same way, passage 57 comprises, proceeding from section 50 to section 51 according to the rotating sense of shutter 30 shown in FIGS. 5 to 10:
- a relative portion 59 radially defined between stretch 49 and the boundary of seat 43, and which has gradually increasing radial size;
- a relative portion 58 radially defined between stretch 48 and the boundary of seat 43, and which has gradually decreasing radial size; and
- a relative constant radial size portion 60 radially defined between section 51 and the boundary of seat 43.

Hole 54 opens into portions 59 and is interposed between portions 59.

With reference to FIGS. 1 to 4, openings 26, 27 have a length along a direction orthogonal to the length of hole 54.

In greater detail, openings 26, 27 have a length extending orthogonally to axis A and parallel to the plane of walls 28, 29, respectively.

Still more precisely, the width of opening 26 measured parallel to axis A decreases, proceeding from one of wall 33b towards other wall 33a orthogonally to axis A.

Figure 1:
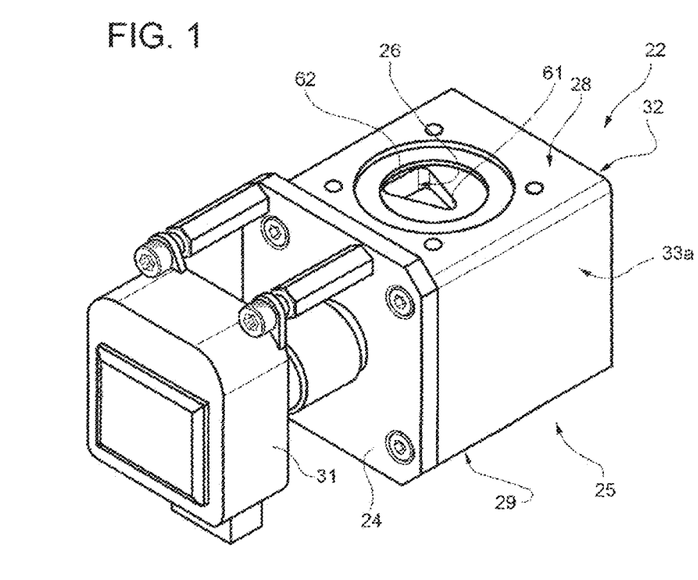
FIG. 1 is a perspective view of a valve comprising a shutter, in accordance with the present invention.

In the embodiment shown, opening 26 is shaped as an isosceles triangle which has a base 61 arranged towards wall 33b and an apex 62 opposite to base 61 and arranged toward wall 33a (FIGS. 1 and 2).

The width of opening 26 measured parallel to axis A decreases, proceeding from wall 33a towards wall 33b orthogonally to axis A.

Figure 3:
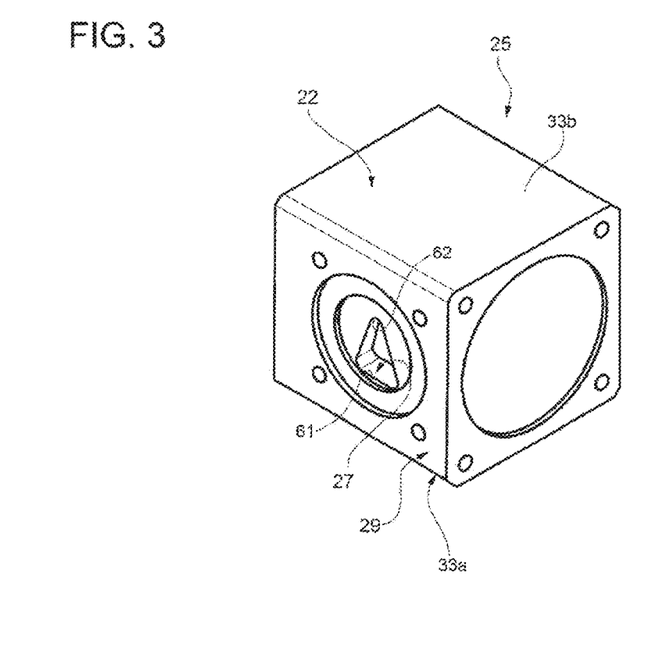
FIG. 3 is a perspective view of a body of the valve of FIGS. 1 and 2, with parts removed for clarity.

Opening 27 is also shaped as an isosceles triangle, which has a base 61 arranged toward wall 33a and apex 62, opposite to base 61, and arranged toward wall 33b (FIG. 3).

In other words, openings 26, 27 have an increasing width, proceeding according to the rotation sense of shutter 30 indicated in FIGS. 4 to 10.

Each shutter 30 of valve 22 is generally kept by relative actuator 31 in a fixed angular position about axis A, on the basis of the amount of hot sterile air flow required by relative nozzle 15, 17, 18, 21.

Alternatively, the angular position of shutter 30 of valves 22 about axis A may be dynamically varied by relative actuators 31.

Figure 11:
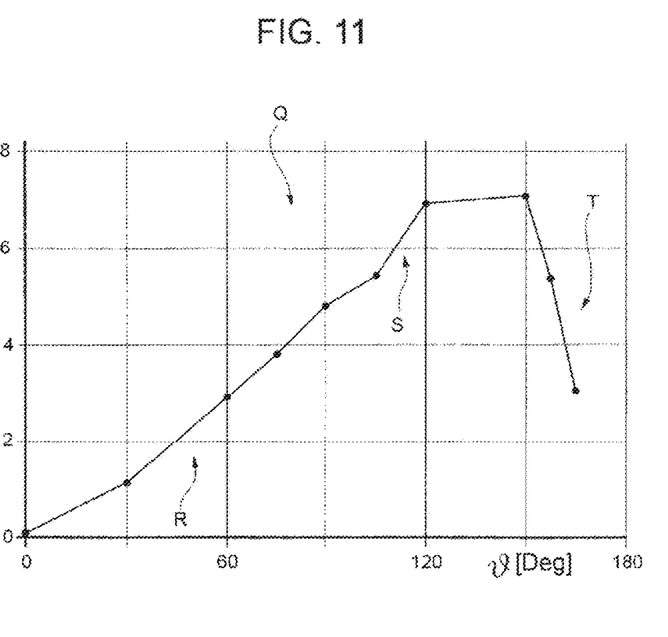
FIG. 11 is a graphic of the sterile air flow versus the rotation angle of the shutter, for the valve of FIGS. 1 to 10.

With reference to FIG. 11, it is shown the plot Q of hot sterile air flow coming out from valve 22 alongside rotation angle $\vartheta$ of shutter 30 about axis A.

Figure 5:
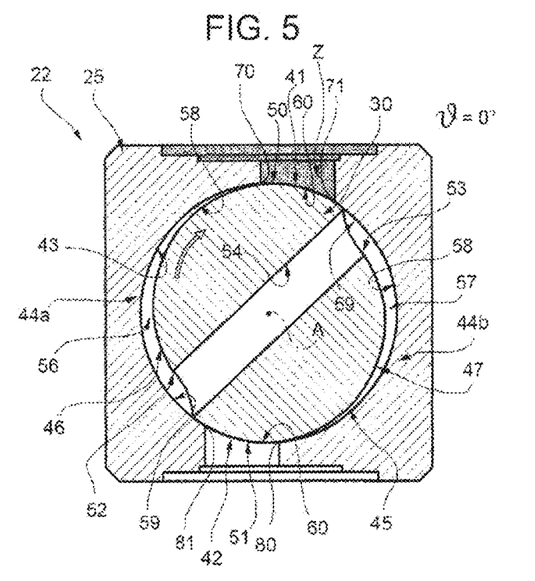
FIGS. 5 to 10 show the transversal section of the valve of FIGS. 1 to 4 in respective different operative positions.

In particular, rotation angle $\vartheta$ is zero when section 50 is at a circumferential edge 70 of mouth 41 and section 51 is at a circumferential edge 80 of mouth 42 (FIG. 5).

Figure 10:
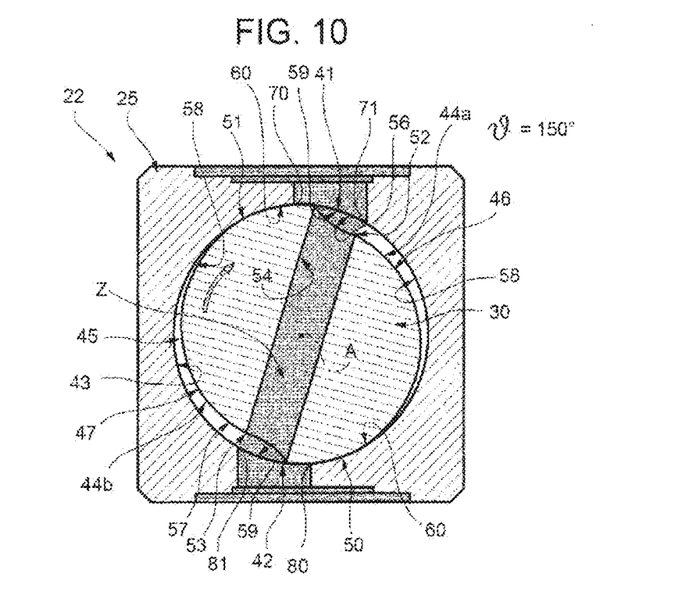

Plot Q substantially comprises:
- a stretch R in which the hot sterile air flow increases in a roughly linear way relative to rotation angles $\vartheta$ and which corresponds to rotation angles $\vartheta$ ranging from zero to about 120 degrees (FIGS. 5 to 9);
- a stretch S which is less sloped than stretch R, in which hot sterile air flow linearly increases relative to rotation angle $\vartheta$ and which corresponds to rotation angles $\vartheta$ ranging from about 120 to about 150 degrees (FIGS. 9 and 10); and
- a stretch T in which hot sterile air flow linearly decreases relative to rotation angle $\vartheta$ and which corresponds to rotation angles $\vartheta$ greater than about 150 degrees (FIG. 10).

It is important to mention that both the sterile air flow concentrated load losses and the distributed load losses between openings 26, 27 depend on rotation angle $\vartheta$.

As far as the distributed load losses are concerned, shutter 30, body 25 and mouths 41, 42 define a preferential path Z (shown in FIGS. 5 to 10) for the hot sterile air flow. The length of path Z and, therefore, the resulting distributed load losses, depends on rotation angle $\vartheta$.

Path Z is indicated in FIGS. 5 to 10 by the shaded area.

In greater detail, as shown in FIGS. 4 to 9, path Z substantially comprises:
- the portions of passages 56, 57 arranged between mouths 41, 42 of openings 26, 27 respectively and hole 54; and
- hole 54.

The length of the portions of passages 56, 57 depends on rotation angle $\vartheta$ whereas the length of hole 54 is constant for each rotation angle $\vartheta$.

Concentrated load losses are caused by the fact that the hot sterile air flow is conveyed in restricted sections when moving from mouth 41 into passage 56 and when moving from passage 57 into mouth 42. The width of these restricted sections and, therefore, the resulting concentrated load losses, depend on rotation angle $\vartheta$ as visible in FIGS. 4 to 10.

The combined effects of both concentrated and distributed load losses are illustrated by plot Q, as it will be explained below.

In particular, when rotation angle $\vartheta$ equals 0 degree (FIG. 5), end 70 of mouth 41 faces section 50 and section 51 faces end 80 of mouth 42.

Accordingly, as shown in FIG. 5, the hot sterile air flow tends to move along the whole passage 56, then enters hole 54, moves along the whole passage 57 and finally reaches mouth 42, conduit 38 and outlet opening 27.

In view of the above, path Z is the longest possible, thus maximizing the resulting distributed load loss.

Furthermore, the hot sterile air flow is forced to enter both portions 60 of passage 56, 57. Due to the fact that portions 60 define the radial narrowest sections of passages 56, 57, the resulting concentrated pressure losses are the highest.

As a result of both the highest concentrated and distributed loss, the amount of hot sterile air flow is the minimum when rotation angle $\vartheta$ is null.

As rotation angle $\vartheta$ is increased by actuator 31 (FIGS. 6 to 8), mouth 41 opens into portion 58 of passage 56 and portion 58 of passage 57 opens into mouth 42.

Figure 6:
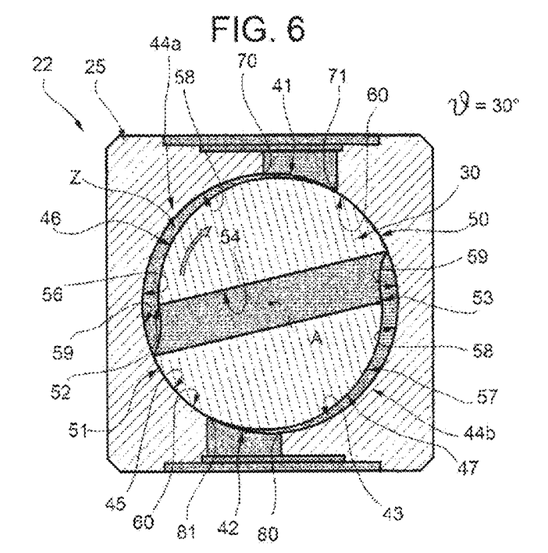
Figure 7:
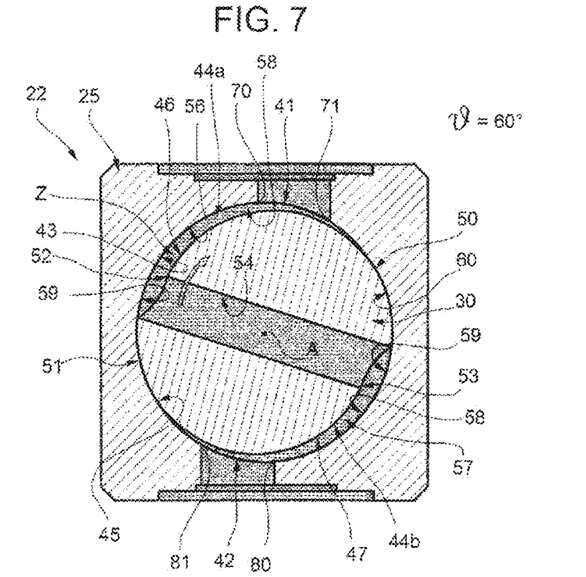
Figure 8:
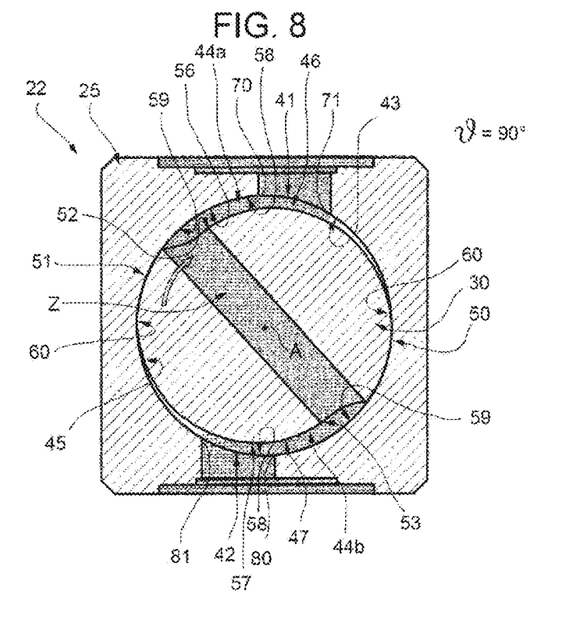
Figure 9:
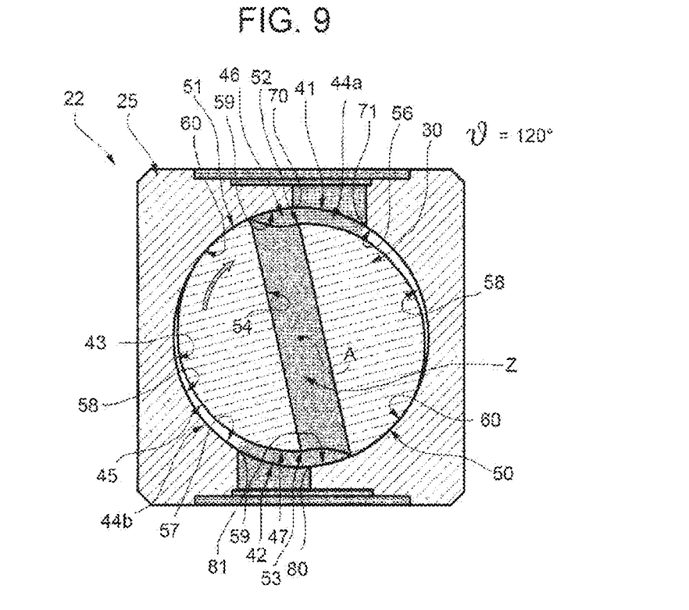

Accordingly, the hot sterile air flow tends to move along the path Z formed by:
- only the part of portion 58 of passage 56 interposed between mouth 41 and hole 54;
- hole 54; and
- only the part of portion 58 of passage 57 interposed between hole 54 and mouth 42.

It is therefore apparent that length of path Z decreases, as rotation angle $\vartheta$ increases.

Furthermore, due to the fact that portions 58 are radially wider than portions 60 and have progressively increasing radial size, the hot sterile air flow is forced to pass through progressively wider radial section, as rotation angle $\vartheta$ increases.

Accordingly, as rotation angle ϑ increases, both the distributed and concentrated pressure losses decrease. As a result, stretch R of plot Q is quasi-linear.

When rotation angle ϑ is about 120 degrees (FIG. 9), mouth 41 opens into portion 59 of passage 56 and portion 59 of passage 57 faces mouth 42.

Due to the fact that hole 54 connects stretches 48, 49, the load losses due to the change of section between conduit 37 and passage 60 is particularly low for this range rotation angle ϑ. This reduced load losses would contribute to highly increase the hot sterile air flow which passes through valve 22.

However, it should be taken into account that openings 26, 27 have a length which extends orthogonally to the length of hole 54 and a triangular shape that cooperates with passage 56, 57. This contributes to contain the hot sterile air flow which passes through valve 22.

The Applicant has found that the combination of these two effects causes the quasi-linear shape of stretch S of plot Q and avoids that the flow suddenly increases for rotation angle closer to 120 degrees.

As rotation angle ϑ further increases (FIG. 10), section 51 circumferentially overcomes end 70 of mouth 41 and section 52 circumferentially overcomes end 71 of mouth 42.

Accordingly, the hot sterile air flow has to flow through progressively narrowing section, thus increasing the resulting load losses and progressively decreasing the hot sterile air flow in the stretch T of plot Q.

In actual use, web 3 is unwound off reel 75 and fed along path P (FIGS. 12 and 13).

More specifically, web 3 is fed by guide members 5 along path P and through aseptic chamber 19.

In detail, web 3 is at first advanced inside tank 14 so as to be sterilized by the peroxide hydrogen.

Subsequently, nozzle 15 blows a jet of hot sterile air onto web 3, so as to remove the residues of the peroxide hydrogen.

Web 3 then passes through stations 7 and 8, which are arranged inside aseptic chamber 19.

In detail, nozzles 21 blow jets of hot sterile air into aseptic chamber 19, so that the latter is kept at a temperature and a pressure greater than environment ones.

Forming assemblies 40 gradually interact with web 3, so as to fold and form tube 10, by superimposing edges 16.

At station 8, superimposed edges 16 are heated by a jet of sterile hot air blown by nozzles 17.

In this way, the packaging material of edges 16 is heated to melt the polyethylene layer and seal 11 is formed.

In the normal operation of machine 1, nozzles 18 are not activated.

In case of interruption of the operation of packaging machine 1, previously heated superimposed edges 16 arranged in front of nozzle 18 cool down.

In this case, when machine 1 starts again, nozzles are activated to blow hot sterile air onto these cooled down edges 16, so that seal 11 is correctly formed.

The longitudinally sealed tube 10 is filled continuously with the pourable food product by device 12.

Tube 10 is then conveyed to the forming unit 13 where it is gripped, sealed, and cut along equally spaced cross sections to form a succession of packs 2, which are subsequently folded so as to form respective packages 4.

Valves 22 control the flow of hot sterile air at respective nozzles 15, 17, 18, 21.

In detail, actuator 31 of each valve 22 sets relative shutter 30 at a given angle ϑ, so that a corresponding hot sterile air flow can reach relative nozzle 15, 17, 18, 21.

The advantages of shutter 30 according to the present invention will be clear from the foregoing description.

In particular, due to the eccentrically shaped portions 46 and 47 of shutter 30, the variation of hot sterile air flow with respect to rotation angle ϑ is substantially piecewise linear and precisely controllable in a wide range of rotation angles ϑ.

In this respect, the Applicant has found that, due to the shape of passages 56, 57, as rotation angle ϑ increases, the hot sterile air flow gently varies without any sudden jump as shown in FIG. 11.

In this way, small positioning errors in rotation angle ϑ do not result in any sensible variation in the amount of flow of hot sterile air conveyed to opening 27.

The Applicant has also found that the shape of passage 56, 57 results in a variation of both concentrated and distributed load loss, as rotation angle ϑ increase. This has been found to be effective in extending the range of rotation angles ϑ in which the hot sterile air flow may be controlled.

Furthermore, openings 26, 27 are elongated orthogonally to the length of hole 54.

Accordingly, even when hole 54 faces mouths 41, 42 as shown in FIG. 8, there is no sudden increase in the hot sterile air flow conveyed by valve 22. This is shown in stretch S of plot P.

Furthermore, due to the presence of a radial gap between sections 50 and walls 36a, 36b and to the fact that shutter 30 has no components protruding outside body 25, valve 22 may be easily sterilized by the flow of hot sterile air onto surface 45.

Finally, valve 22 has a very limited number of components and is therefore very easy to manufacture and maintain.

Clearly, changes may be made to machine 1 and to the method as described and illustrated herein without, however, departing from the scope defined in the accompanying Claims.

In particular, openings 26, 27 may be rectangular with a length orthogonal to axis A.

Furthermore, openings 26, 27 may have another shape, such as oval or round, for example.

Finally, the application of shutter 30 and valve 22 may be for fluids other than air, such as gasses or liquids, or to control non-sterile fluid flows.

The invention claimed is:

1. A valve for controlling an air flow, comprising:
a body defining an inlet opening for air flow, an outlet opening for air flow, and a pair of walls defining a valve seat between the inlet opening and the outlet opening;
the inlet opening having an inlet mouth that opens into an interior of the body and the outlet opening having an outlet mouth that opens into the interior of the body;
a cylindrically-shaped shutter positioned in the valve seat and selectively rotatable about an axis to control the air flow;
the cylindrically-shaped shutter comprising an outer surface disposed about the axis and extending along an outer circumference of the shutter; and
the outer surface of the shutter comprising a first curved portion shaped eccentrically relative to the axis and extending along the outer circumference of the shutter to define, together with the pair of walls defining the valve seat, at least one first passage for the air flow, the at least one first passage being fluidly connectable to the inlet opening;
the outer surface of the shutter comprising a second curved portion shaped eccentrically relative to the axis and extending along the outer circumference of the shutter to define, together with the pair of walls defining the valve seat, a second passage for the air flow, the second passage being fluidly connectable to the outlet opening;

a through hole passing through the shutter and having a longitudinal extent parallel to the axis, the through hole opening to the outer surface of the shutter at a first end of the through hole, the first end of the through hole including first and second diametrically opposite points as seen in a plane perpendicular to the axis and perpendicular to the longitudinal extent of the through hole;

the through hole opening to the outer surface of the shutter at a second end of the through hole, the second end of the through hole including diametrically opposite third and fourth points as seen in the plane;

the first curved portion of the outer surface that is shaped eccentrically relative to the axis including, in the following order in a circumferential direction as seen in the plane: i) a first stretch which extends at a gradually decreasing radial distance from the axis, the first stretch extending from the first point to the second point; ii) a first relative section extending at a minimum radial distance from the axis to define a minimum radial size of the first curved portion of the outer surface of the shutter; and iii) a second stretch which extends at a gradually increasing radial distance from the axis; and the second curved portion of the outer surface that is shaped eccentrically relative to the axis including, in the following order in a circumferential direction as seen in the plane: i) a third stretch which extends at a gradually decreasing radial distance from the axis, the third stretch extending from the third point to the fourth point; ii) a second relative section extending at a minimum radial distance from the axis to define a minimum radial size of the second curved portion of the outer surface of the shutter; and iii) a fourth stretch which extends at a gradually increasing radial distance from the axis.

2. The valve of claim 1, wherein said outer surface of the shutter further comprises:

a circumferential first end section;

the second stretch being located between the circumferential first end section and the first stretch along the circumferential direction; and a circumferential second end section, which is opposite to said circumferential first end section, the fourth stretch being located between the third stretch and the circumferential second end section along the circumferential direction.

3. The valve of claim 2, wherein said circumferential end sections extend at a constant radial distance from said axis.

4. The valve of claim 3, wherein said through hole opens into said first stretch and the third stretch.

5. The valve of claim 1, wherein said outer surface is symmetrical relative to said axis.

6. The valve of claim 1, wherein the inlet opening and the inlet mouth comprise an inlet conduit, and the outlet opening and the outlet mouth comprise an outlet conduit, at least one of said inlet conduit and said outlet conduit extends along a first direction; and the shutter is configured such that, at least at one point in time during rotation of the shutter inside the body of the valve, said through hole extends along a second direction transversal to said first direction.

7. The valve of claim 6, wherein at least one of said inlet conduit and said outlet conduit possesses a width as measured in a direction that is a direction of rotation of the shutter.

8. The valve of claim 6, wherein said at least one of said inlet conduit and said outlet conduit defines a triangular opening including a base and possessing a height, the base of the triangular opening being parallel to said axis and the height of the triangular opening being orthogonal to said axis.

9. The valve of claim 1, wherein said inlet mouth, said outlet mouth and said shutter define a preferential path for said air flow;

said path comprising the portion of said first passage which extends between said inlet mouth and said through hole, and the portion of said second passage which extends between said through hole and said outlet mouth; and the length of said path depending on an angular position of said shutter about said axis.

10. The valve of claim 1, comprising an actuator for selectively rotating said shutter relative to said body.

11. The valve of claim 1, wherein the inlet conduit possesses a central axis and the outlet conduit possesses a central axis, the central axis of the inlet conduit being offset from the central axis of the outlet conduit as seen in the plane, the central axis of the inlet conduit and the central axis of the outlet conduit both being offset from the rotation axis of the shutter.

12. The valve of claim 1, wherein the inlet conduit possesses a central axis and the outlet conduit possesses a central axis, the central axis of the inlet conduit being offset from the rotation axis of the shutter as seen in the plane, the central axis of the outlet conduit being offset from the rotation axis of the shutter as seen in the plane.

* * * * *